United States Patent [19]

Hashimoto

[11] Patent Number: 5,424,854

[45] Date of Patent: Jun. 13, 1995

[54] IMAGE PROCESSING APPARATUS FOR HALF-TONE PROCESSING AND REPRODUCING HIGH SPEED IMAGES OF DIFFERENT RESOLUTIONS

[75] Inventor: Yasunori Hashimoto, Yokohama, Japan

[73] Assignee: Canon Kabushiki Kaisha, Tokyo, Japan

[21] Appl. No.: 39,687

[22] Filed: Mar. 30, 1993

Related U.S. Application Data

[63] Continuation of Ser. No. 635,226, Dec. 28, 1990, abandoned.

[30] Foreign Application Priority Data

Dec. 28, 1989 [JP] Japan .................................. 1-344805

[51] Int. Cl.$^6$ .............................................. H04N 1/40
[52] U.S. Cl. .................................. 358/456; 358/457; 358/462; 358/466; 358/467
[58] Field of Search ............... 358/429, 455, 456, 457, 358/462, 466, 467

[56] References Cited

U.S. PATENT DOCUMENTS

| | | | |
|---|---|---|---|
| 4,004,079 | 1/1977 | Boston | 358/462 |
| 4,288,821 | 9/1981 | Lavallee et al. | 358/496 |
| 4,517,605 | 5/1985 | Yokomizo | 358/457 |
| 4,734,784 | 3/1988 | Tanaka | 358/456 |
| 4,782,400 | 11/1988 | Ohtani | 358/283 |
| 5,014,124 | 5/1991 | Fujisawa | 358/457 |
| 5,175,635 | 12/1993 | Yamada et al. | 358/467 |
| 5,218,457 | 6/1993 | Burkhardt et al. | 358/455 |

Primary Examiner—Edward L. Coles, Sr.
Assistant Examiner—Kimberly A. Williams
Attorney, Agent, or Firm—Fitzpatrick, Cella, Harper & Scinto

[57] ABSTRACT

An image processing apparatus for half-tone processing input image data having different resolutions by using a dither matrix consisting of a plurality of threshold values is disclosed. The apparatus includes an input device to input image data; a high-resolution dither processing unit to half-tone process the image data of a high resolution; a low-resolution dither processing unit to half-tone process the image data of a low resolution; and a selector to select either one of the two processing units in accordance with the resolution of the input image data. The input device includes a reader to read an original image and generate image data and a resolution conversion processing unit to convert the resolution of the image data obtained by the reader. The high-resolution processing unit uses a spiral-type dither matrix. The low-resolution processing unit uses a dither matrix including a plurality of small spiral-type dither matrices. The input images of different resolutions can be accurately reproduced.

9 Claims, 11 Drawing Sheets

FIG. 4

| 43 | 44 | 45 | 46 | 47 | 48 | 49 | 50 |
|----|----|----|----|----|----|----|----|
| 42 | 21 | 22 | 23 | 24 | 25 | 26 | 51 |
| 41 | 20 | 7  | 8  | 9  | 10 | 27 | 52 |
| 40 | 19 | 6  | 1  | 2  | 11 | 28 | 53 |
| 39 | 18 | 5  | 4  | 3  | 12 | 29 | 54 |
| 38 | 17 | 16 | 15 | 14 | 13 | 30 | 55 |
| 37 | 36 | 35 | 34 | 33 | 32 | 31 | 56 |
| 64 | 63 | 62 | 61 | 60 | 59 | 58 | 57 |

FIG. 5

|   |   |   | 0 |   |   |   | 1 |   | →i |
|---|---|---|---|---|---|---|---|---|----|
| a | 25 | 29 | 33 | 37 | 27 | 31 | 35 | 39 |   |
|   | 21 | 1  | 5  | 41 | 23 | 3  | 7  | 43 | b |
| 0 | 17 | 13 | 9  | 45 | 19 | 15 | 11 | 47 |   |
| $ma(0,0)=31$ | 61 | 57 | 53 | 49 | 63 | 59 | 55 | 51 | $mb(0,1)=33$ |
|   | 28 | 32 | 36 | 40 | 26 | 30 | 34 | 38 |   |
|   | 24 | 4  | 8  | 44 | 22 | 2  | 6  | 42 |   |
| 1 | 20 | 16 | 12 | 48 | 18 | 14 | 10 | 46 | d |
| $mc(0,1)=34$ | 64 | 60 | 56 | 52 | 62 | 58 | 54 | 50 | $md(1,1)=32$ |

| ADDRESS (DECIMAL) | DATA (DECIMAL) | ADDRESS (DECIMAL) | DATA (DECIMAL) |
|---|---|---|---|
| 0 | 25 | 32 | 28 |
| 1 | 29 | 33 | 32 |
| 2 | 33 | 34 | 36 |
| 3 | 37 | 35 | 40 |
| 4 | 27 | 36 | 26 |
| 5 | 31 | 37 | 30 |
| 6 | 35 | 38 | 34 |
| 7 | 39 | 39 | 38 |
| 8 | 21 | 40 | 24 |
| 9 | 1 | 41 | 4 |
| 10 | 5 | 42 | 8 |
| 11 | 41 | 43 | 44 |
| 12 | 23 | 44 | 22 |
| 13 | 3 | 45 | 2 |
| 14 | 7 | 46 | 6 |
| 15 | 43 | 47 | 42 |
| 16 | 17 | 48 | 20 |
| 17 | 13 | 49 | 16 |
| 18 | 9 | 50 | 12 |
| 19 | 45 | 51 | 48 |
| 20 | 19 | 52 | 18 |
| 21 | 15 | 53 | 14 |
| 22 | 11 | 54 | 10 |
| 23 | 47 | 55 | 46 |
| 24 | 61 | 56 | 64 |
| 25 | 57 | 57 | 60 |
| 26 | 53 | 58 | 56 |
| 27 | 49 | 59 | 52 |
| 28 | 63 | 60 | 63 |
| 29 | 59 | 61 | 58 |
| 30 | 55 | 62 | 54 |
| 31 | 51 | 63 | 50 |

IMAGE PROCESSING APPARATUS FOR HALF-TONE PROCESSING AND REPRODUCING HIGH SPEED IMAGES OF DIFFERENT RESOLUTIONS

This application is a continuation of application Ser. No. 07/635,226, filed Dec. 28, 1990, now abandoned.

BACKGROUND OF THE INVENTION

1. Field of the Invention

The present invention relates to an image processing apparatus for half-tone processing input image data by using a threshold value matrix consisting of a plurality of threshold values and, more particularly, to an image processing apparatus which can accurately reproduce input images having different resolutions.

2. Description of the Related Background Art

Hitherto, a dither method has been known as a technique for half-tone processing input image data.

According to the dither method, by binarizing a plurality of input image data by using a threshold value (dither) matrix consisting of a plurality of threshold values, a half-tone image can be reproduced.

However, hitherto, there is a case where even if the resolution of the input image data was changed, the half-tone processing is executed by using the same dither matrix, so that the input image cannot be accurately reproduced.

FIG. 4 shows a spiral-type systematic dither matrix as an example of the dither matrix.

Each of a plurality of input image data is compared with each of the threshold values in the dither matrix of FIG. 4. When the input image data is larger than the threshold value, a signal indicative of black is output. When the input image data is smaller than the threshold value, a signal indicative of white is output. Due to this, the half-tone processing can be performed.

For instance, when image data having a resolution of 400 ppi (pel per inch)×400 ppi and a uniform concentration of a concentration level of 17 is input and binarized by using the dither matrix of FIG. 4, a processing result shown in FIG. 6 is obtained.

On the other hand, when image data having a resolution of 200 ppi×200 ppi and a uniform concentration of a concentration level of 17 is input and binarized by using the same dither matrix (FIG. 4) as that in the above case of the resolution of 400 ppi, a processing result shown in FIG. 13 is obtained.

As mentioned above, in the case where a plurality of input image data of different resolutions were half-tone processed by using the same dither matrix, a pitch of the output image changes by the resolution. There is a drawback such that in spite of the fact that only the resolutions are different, the picture qualities of the images after completion of the processings largely change for the input images of the same picture quality.

SUMMARY OF THE INVENTION

It is an object of the invention to eliminate the drawbacks of the conventional techniques as mentioned above and to provide an image processing apparatus which can accurately reproduce an input image even if a resolution of the input image changes.

Another object of the invention is to provide an image processing apparatus which can obtain an image of a high picture quality at a high speed.

Still another object of the invention is to provide an image processing apparatus comprising first half-tone processing means for half-tone processing image data of a high resolution and second half-tone processing means for half-tone processing image data of a low resolution.

Further another object of the invention is to provide a half-tone processing method which can equalize output images in the case where image data of the same original was input at different resolutions.

Further another object of the invention is to provide an image processing apparatus which can obtain an image of a high picture quality by a simple construction by using the same hardware construction for executing a high-resolution half-tone processing and a low-resolution half-tone processing.

The above and other objects and features of the present invention will become apparent from the following detailed description and the appended claims with reference to the accompanying drawings.

BRIEF DESCRIPTION OF THE DRAWINGS

FIGS. 3-1 and 3-2 are diagrams showing control flows of the facsimile apparatus which embodies the invention;

FIG. 4 is a diagram showing a dither matrix for a high resolution;

FIG. 5 is a diagram showing a dither matrix for a low resolution;

FIG. 9 is a diagram showing the content of data stored in a ROM 803:

DETAILED DESCRIPTION OF THE PREFERRED EMBODIMENTS

Figure 1:
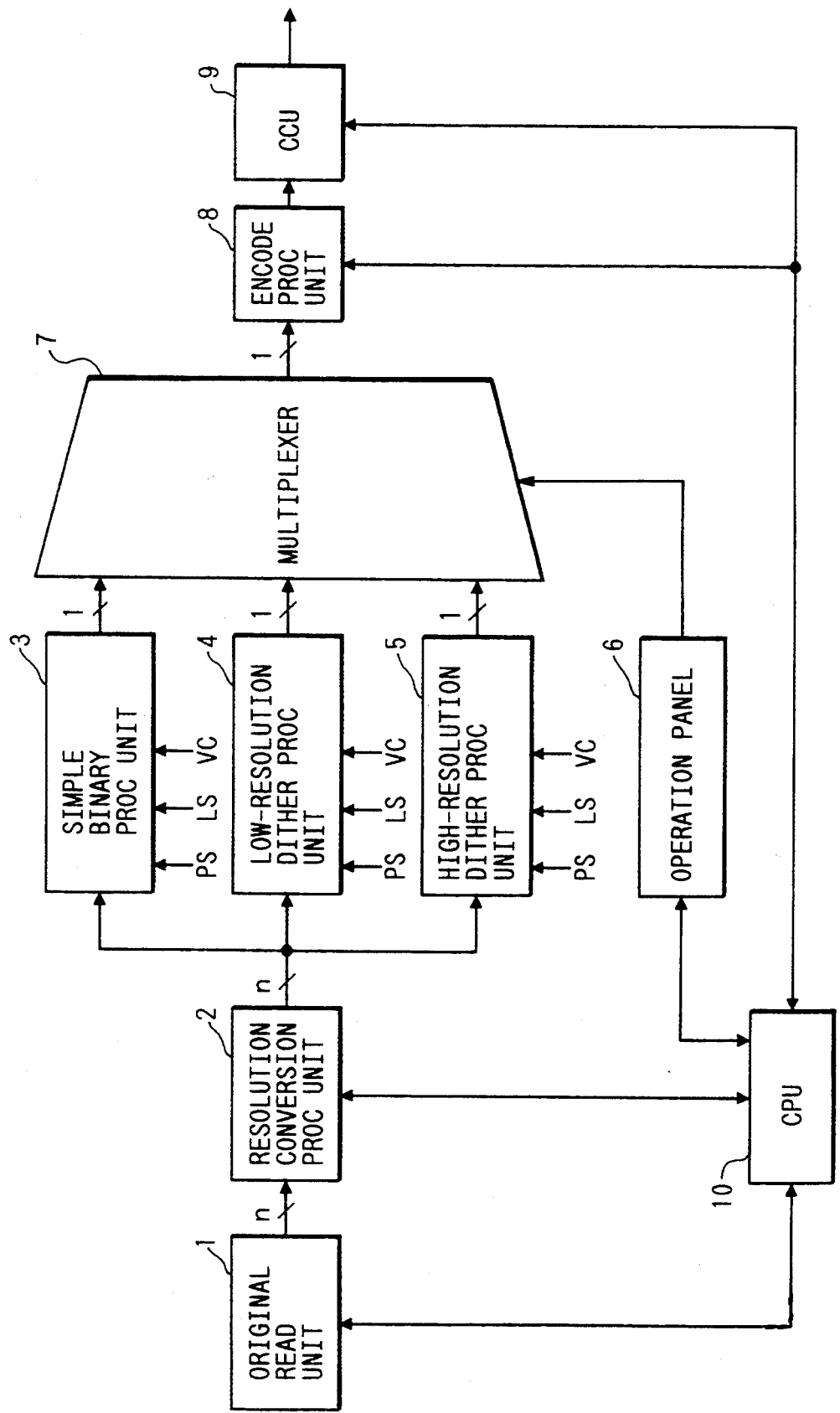
FIG. 1 is a block diagram of a facsimile apparatus as an embodiment of the invention.
Figure 2:
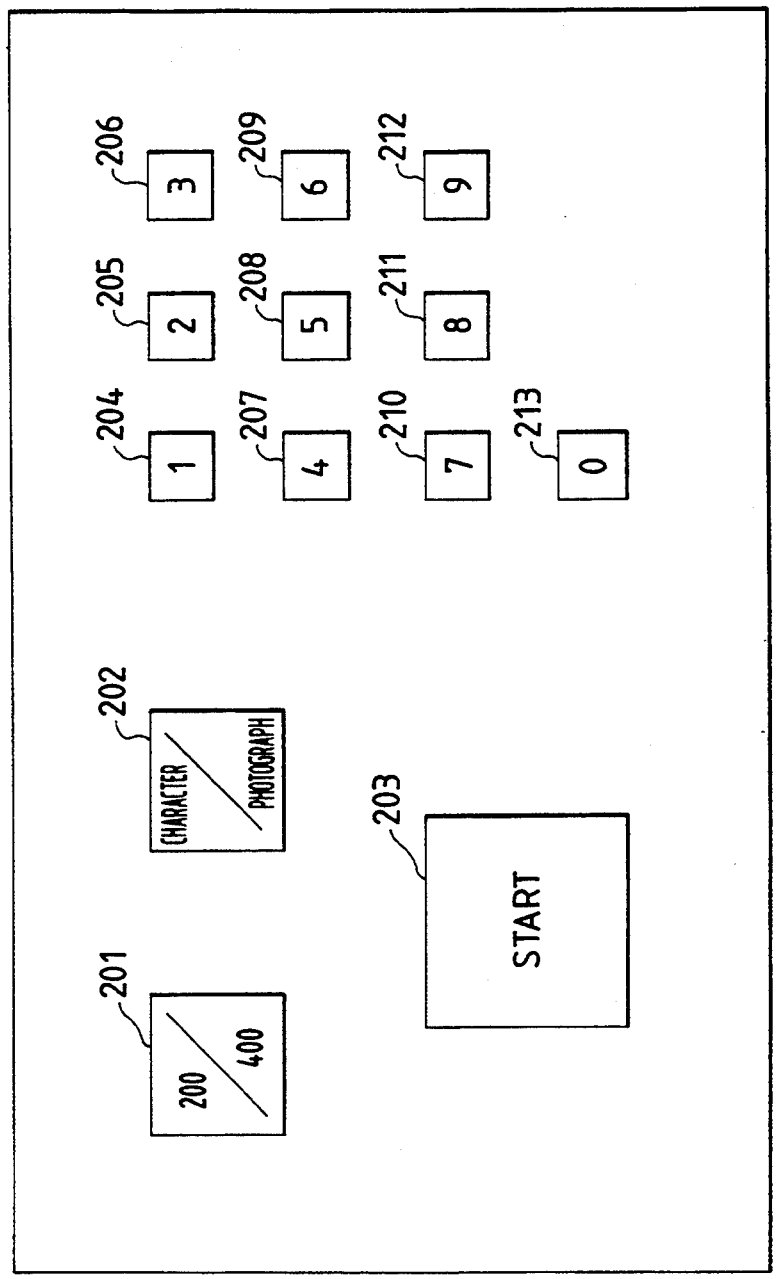
FIG. 2 is a diagram showing an operation panel.

FIG. 1 is a block diagram of a facsimile apparatus according to an embodiment of the invention. In the diagram, reference numeral 1 denotes an original read unit for reading an original by scanning the original by a CCD or the like; 2 a resolution conversion processing unit for converting a resolution of the image data which was read by the original read unit 1; 3 a simple binary processing unit for binarizing the image data sent from the resolution conversion processing unit 2 on the basis of a fixed threshold value; 4 a low-resolution dither processing unit for binarizing the image data by using a dither matrix for a low resolution; 5 a high-resolution dither processing unit for binarizing the image data by using a dither matrix for a high resolution; and 6 an operation panel to instruct the input of a facsimile number, the selection of a resolution, the selection of either a character mode or a photograph mode, the reading of the original, and the start of a transmitting operation. Reference numeral 7 denotes a multiplexer for selecting either one of output signals of the processing units 2, 3, 4, and 5 in accordance with the image read mode which was instructed by the operation panel 6 and for outputting the selected signal. Reference numeral 8 denotes an encode processing unit for encoding white and black image data which is output from the multiplexer 7; 9 a CCU (communication control unit) to transmit the encoded data which is output from the encode processing unit 8 to a line; and 10 a CPU to control the whole apparatus in accordance with a flowchart, which will be explained hereinlater. FIG. 2 is a diagram showing the details of the operation panel 6. Reference numeral 201 denotes a key to select an original reading resolution. Each time the key 201 is depressed, the resolution is switched between 200 ppi×200 ppi and 400 ppi×400 ppi. Reference numeral 202 denotes a key to select a read mode of an original. Each time the key 202 is depressed, the read mode is switched between the character mode and the photograph mode. Reference numeral 203 denotes a start key to instruct the start of the transmitting operation. Reference numerals 204 to 213 indicate dial keys to input a facsimile number.

Figures 1, 3:
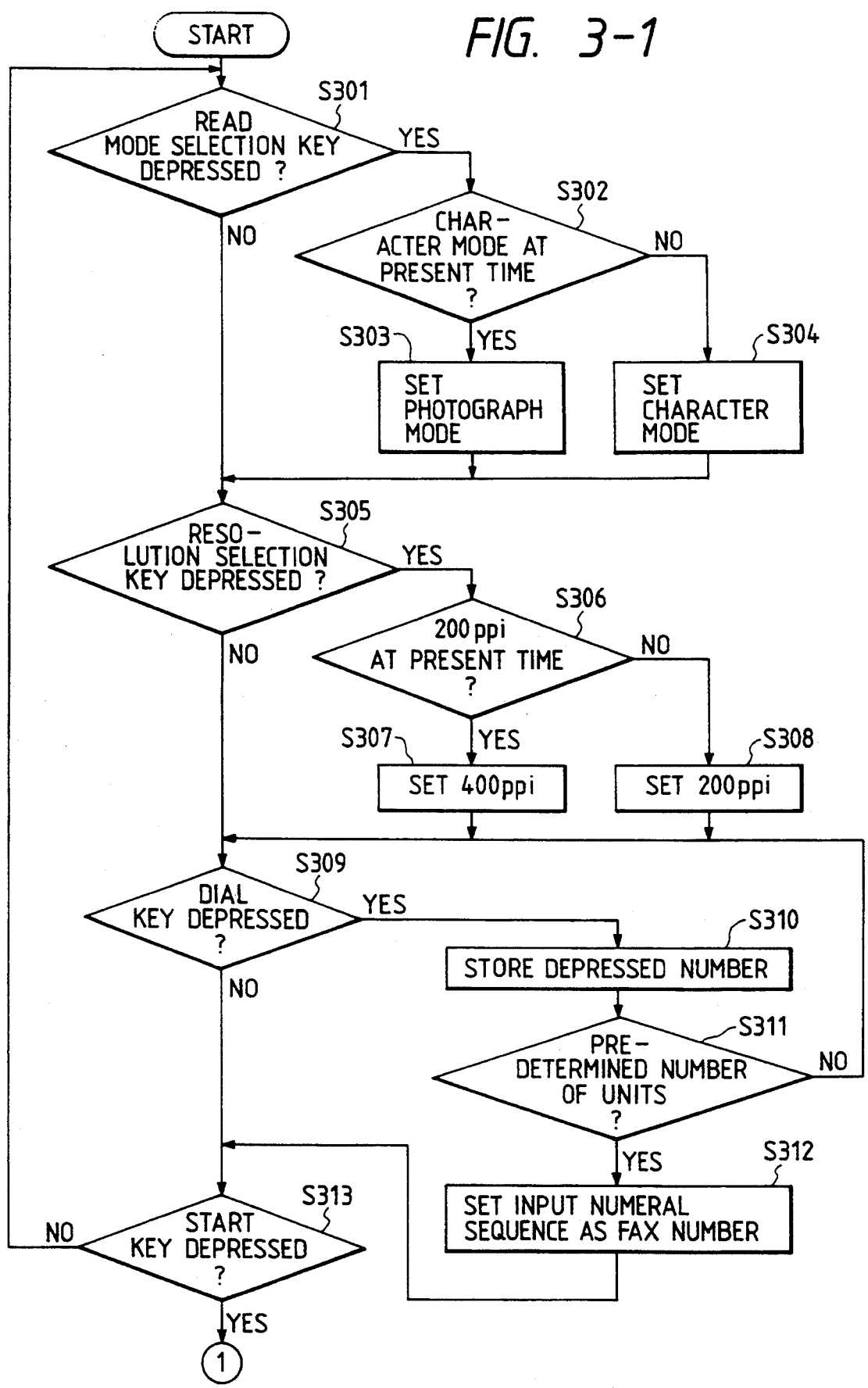
Figures 2, 3:
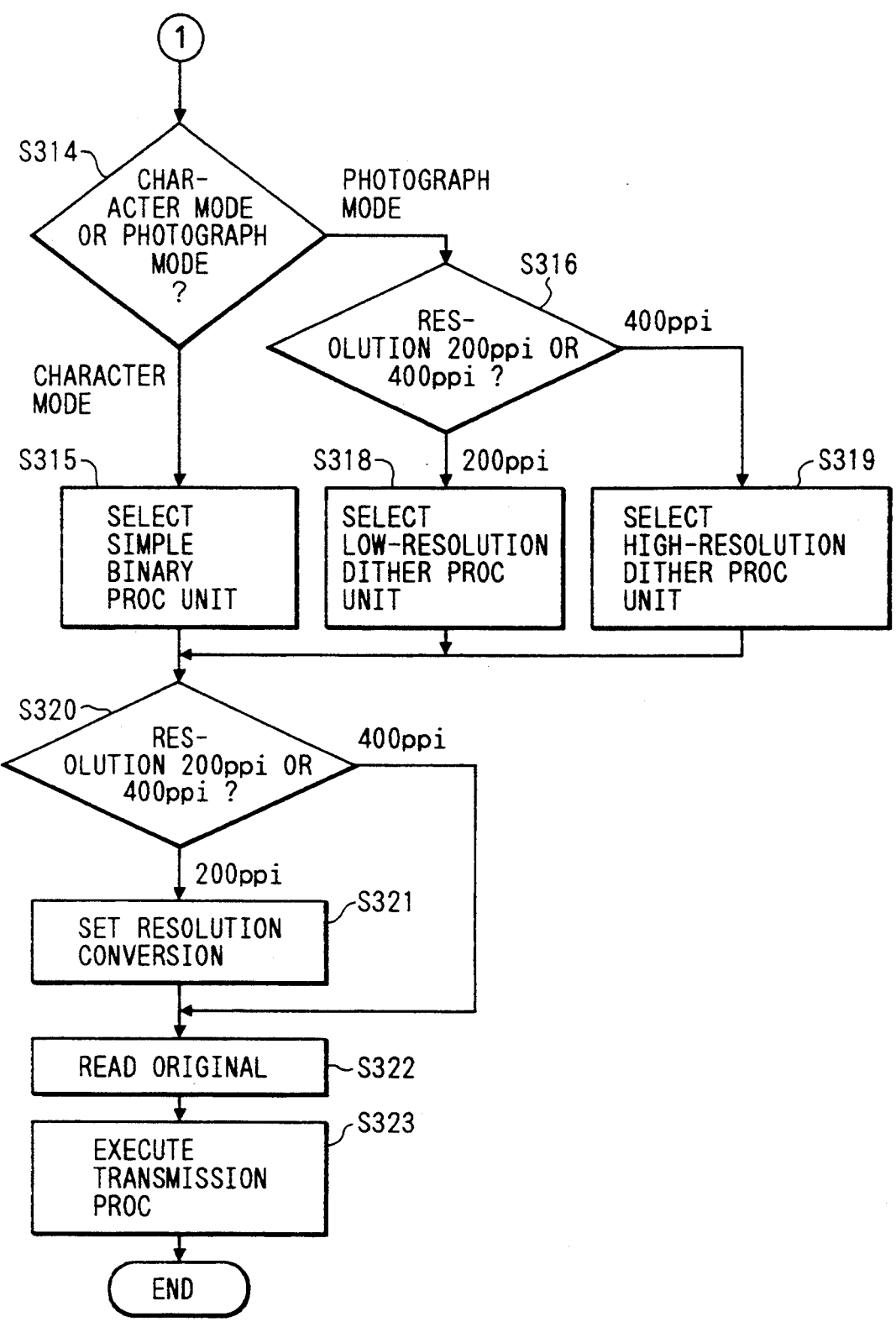

FIGS. 3-1 to 3-2 are flowcharts showing a control procedure which is executed by the CPU 10 upon transmission. The operation will now be described in accordance with the flowcharts. First, the operator depresses the read mode selection key 202 in accordance with the kind of original, thereby selecting either the character mode or the photograph mode. Each time the selection key 202 is depressed, the character mode and the photograph mode are alternately switched. In step S301, a check is made to see if the read mode selection key 202 has been depressed or not. If it has been depressed, step S302 follows and the present mode is discriminated. If the character mode is set at a present time, the read mode is set to the photograph mode (S303). If the photograph mode is set at a present time, the read mode is set to the character mode (S304). Then, the operator depresses the resolution selection key 201 in accordance with a desired resolution, thereby selecting either the resolution of 200 ppi×200 ppi or the resolution of 400 ppi×400 ppi. Each time the resolution selection key 201 is depressed, the resolution of 200 ppi×200 ppi and the resolution of 400 ppi×400 ppi are alternately switched. In step S305, a check is made to see if the resolution selection key 201 has been depressed or not. If YES, step S306 follows and the present resolution mode is discriminated. If the resolution of 200 ppi is set at a present time, the mode is set to 400 ppi (S307). If 400 ppi is set at a present time, the mode is set to 200 ppi (S308). Then, when the operator depresses the dial keys a number of times as many as a predetermined number of units and depresses the start key 203, the CPU 10 advances to steps S309 to S314.

In step S314, a check is made to see if the selected mode is the character mode or the photograph mode. In the case of the character mode, step S315 follows and the CPU 10 instructs the multiplexer 7 to select the simple binary processing unit 3 irrespective of the selected resolution. Then, step S320 follows and a check is made to see if the selected resolution is 200 ppi or 400 ppi. In the case of 400 ppi, the resolution conversion is not executed. This is because the original read unit has already been constructed so as to ordinarily execute the reading operation at a resolution of 400 ppi. If 200 ppi has been set, the CPU 10 instructs the resolution conversion processing unit 2 to execute a resolution conversion processing. In step S322, the CPU instructs the original read unit 1 to read the original. In response to the above conversion instruction, the image data from the image read unit 1 is resolution-converted by the resolution conversion processing unit 2 as necessary. The resolution conversion is executed by a well-known method such as SPC method, OR method, thinning-out method, projecting method, or the like. The image data from the resolution conversion processing unit 2 is binary processed by the simple binary processing unit 3, low-resolution dither processing unit 4, and high-resolution dither processing unit 5, respectively. Since the multiplexer 7 has been set so as to select the binary data from the simple binary processing unit 3 in step S315, the binary data of the processing unit 3 is selected and output to the encode processing unit 8.

In step S323, a transmission processing is instructed to the encode processing unit 8 and CCU 9. In response to the transmission command, the encode processing unit 8 encodes the binary data which was output from the multiplexer 7 by an encoding method such as MH, MR, MMR, or the like according to the standards of the facsimile apparatus. The encoded data is modulated by the CCU 9 and transmitted to the line.

The case where the photograph mode has been selected in step S314 will now be described. If the photograph mode has been selected, step S316 follows and the selected resolution is discriminated. If the resolution of 400 ppi has been selected, there is no need to execute the resolution conversion as mentioned above. The processing routine advances to step S319 and the CPU instructs the multiplexer 7 so as to select the dither processing unit 5 for a high resolution. The processing unit 5 binarizes the image data by using a dither matrix of FIG. 4. Due to this, for instance, when the concentration levels of the input image data are continuous at 17, a processing result becomes as shown in FIG. 6.

The dither matrix of FIG. 4 is a spiral-type dither matrix for a high resolution in which threshold values are sequentially spirally arranged from the center.

Figure 6:
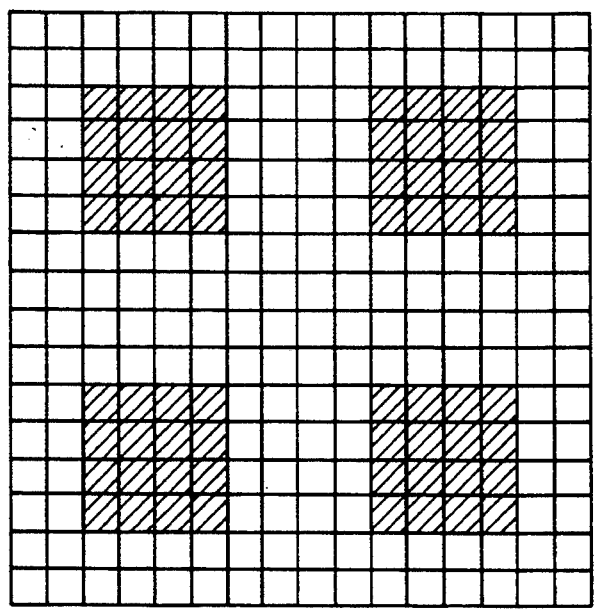
FIG. 6 is a diagram showing the result obtained by processing a photograph image at a resolution of 400 ppi×400 ppi.

The input image data (concentration level 17) of 16×16 is binarized by repetitively using such a matrix consisting of (8×8) threshold values and the result of the processing is shown in FIG. 6.

Since the dither matrix of 8×8 is used four times for the input image data of 16×16, four mesh points (or screens) are formed.

On the other hand, if the resolution of 200 ppi has been selected, step S318 follows and the CPU instructs the multiplexer 7 to select the dither processing unit 4 of a low resolution. The processing unit 4 binarizes the image data by a dither matrix of FIG. 5. Due to this, for instance, when the concentration levels of the input image data are continuous at 17, the processing result is as shown in FIG. 7.

The dither matrix of FIG. 5 is a dither matrix for a low resolution. The dither matrix of FIG. 5 comprises four small dither matrices of a(0, 0), b(1,0), c(0, 1), and d(1, 1). Each of the small dither matrices is a spiral type dither matrix in which threshold values are sequentially spirally arranged from the center. Coordinate values (i, j) correspond to numerical values which were written every four pixels.

For instance, in the matrix of a(0, 0), the threshold values sequentially increase from the center in a manner such that 1→5→9→13→17→...→53→57→61. On the other hand, the average values of the small dither matrices sequentially increase such that a(0, 0)→d(1, 1)→b(0, 1)→c(1, 0).

Figure 7:
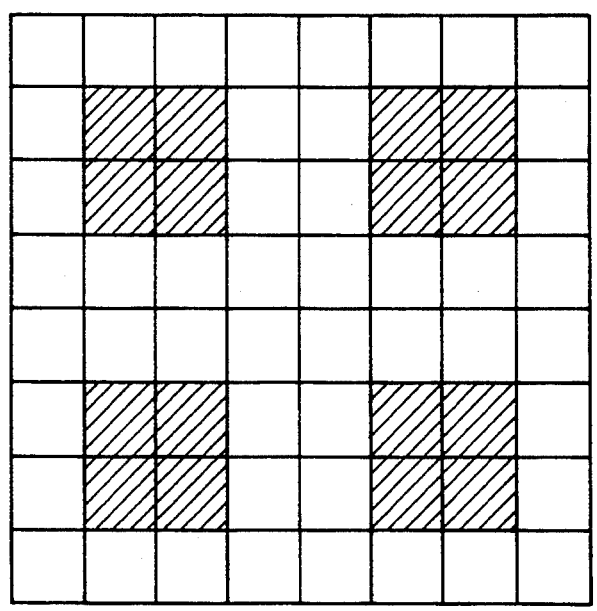
FIG. 7 is a diagram showing the result obtained by processing a photograph image at a resolution of 200 ppi×200 ppi.

That is, since the dither matrix for a low resolution is constructed by using a plurality of small spiral-type dither matrices, if the input image data (concentration level 17) of 8×8 is binarized by using such a large dither matrix of 8×8, four mesh points (or screens) can be formed in the matrix of 8×8 as shown in FIG. 7.

As mentioned above, according to the embodiment, even in the case where the resolutions of the input image data differ, by selecting a proper dither matrix according to the resolution, the same output image can be obtained as shown in FIGS. 6 and 7.

The processings in step S320 and subsequent steps are substantially the same as those described above. The multiplexer 7 selects the binary data from the dither processing unit 4 for a low resolution when the resolution of 200 ppi was selected. The multiplexer 7 selects the binary data from the dither processing unit 5 for a high resolution when the resolution of 400 ppi was selected. The selected binary data is output to the encode processing unit 8.

Signals PS, LS, and VC which were input to the simple binary processing unit 3, low-resolution dither processing unit 4, and high-resolution dither processing unit 5 indicate a page sync signal, a line sync signal, and an image clock, respectively. Those signals are sent from the CPU 10. Each of the above processing units 3 to 5 binarizes the image data sent from the resolution conversion processing unit 2 on the basis of the above control signals.

Figure 8:
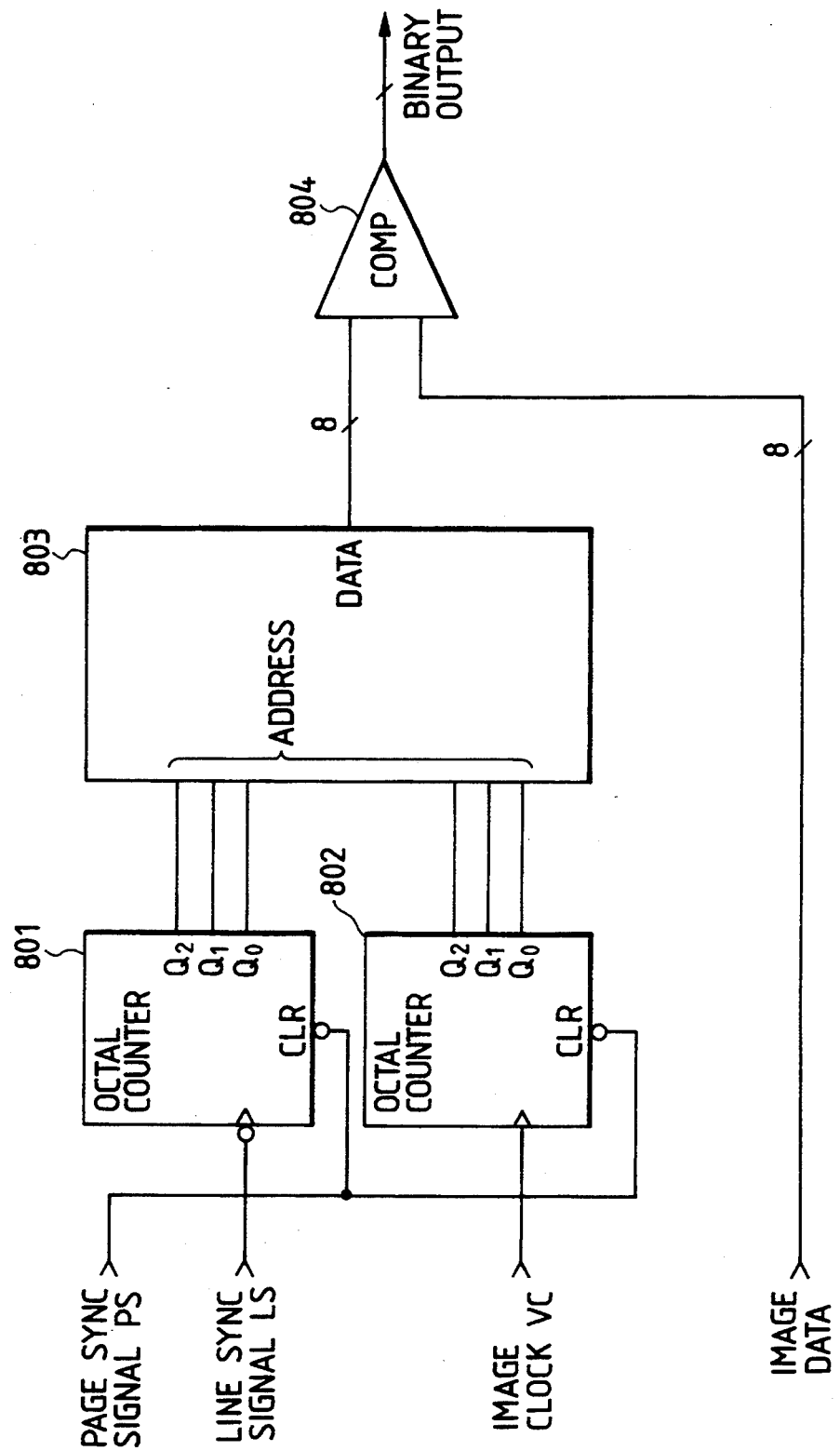
FIG. 8 is a circuit diagram showing the details of a dither processing unit.

FIG. 8 is a diagram showing the details of the dither processing unit 4 for a low resolution. The dither processing unit 5 for a high resolution can be also realized by substantially the same construction as that shown in FIG. 8.

In FIG. 8, reference numeral 801 denotes an octal counter which is counted up each time the line sync signal is input; 802 an octal counter which is counted up synchronously with the image clock; 803 a ROM in which the data of the dither matrices has been stored (the data of the matrix of FIG. 5 has been stored in the case of the low-resolution dither processing unit 4; the data of the matrix of FIG. 4 has been stored in the case of the high-resolution dither processing unit 5); and 804 a comparator for comparing the digital values of eight bits which are output from the ROM 803 with the input image data and outputting a high level signal when the input image data is equal to or larger than the data which is output from the ROM 803 and outputting a low level signal when the input image data is smaller than the output data of the ROM 803.

Figure 10:
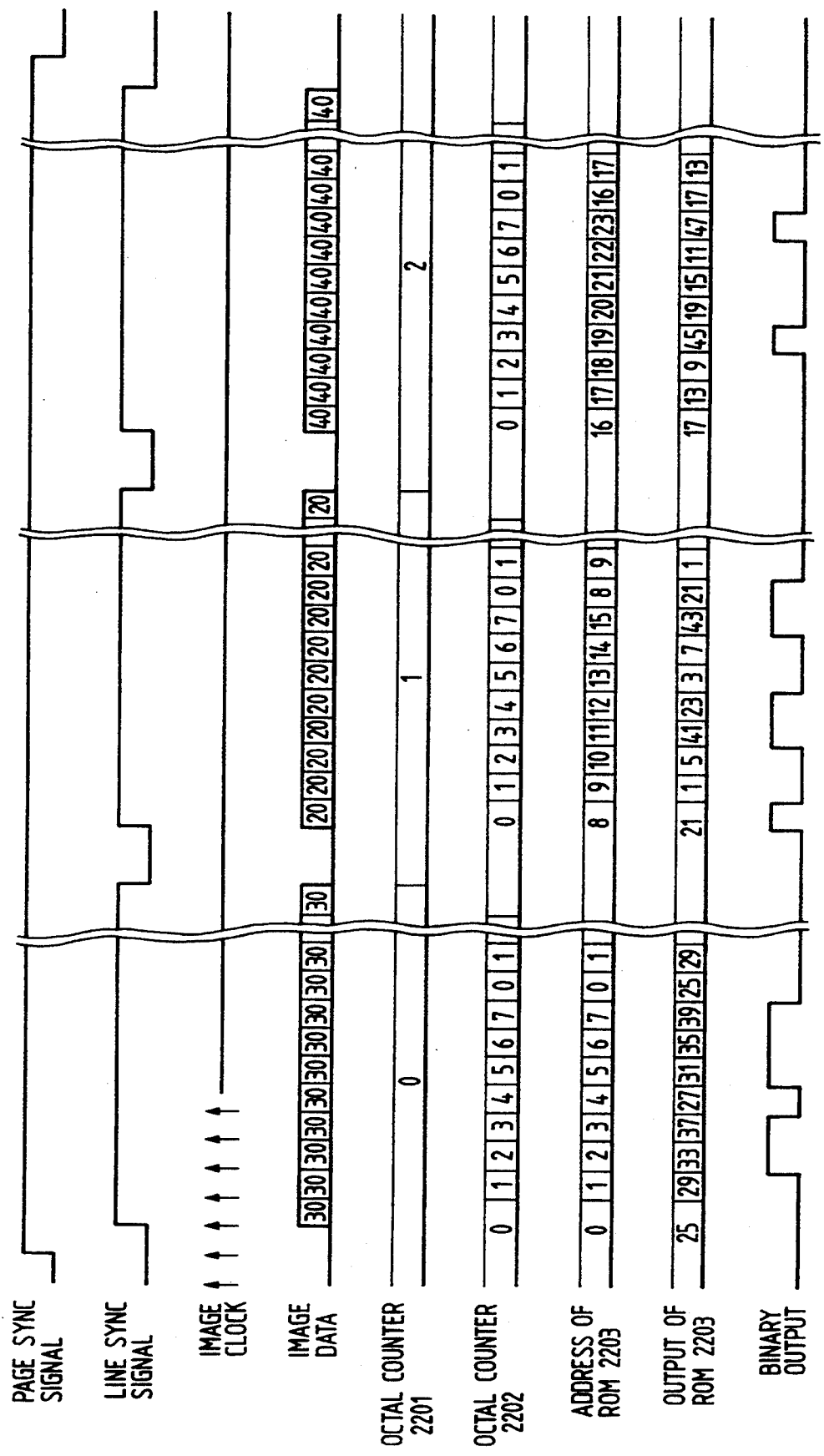
FIG. 10 is a diagram showing a timing chart of the circuit of FIG. 8.

FIG. 9 is a diagram showing the storage data in the ROM 803 and corresponds to the data of the dither matrix of FIG. 5. FIG. 10 is a timing chart of the circuit of FIG. 8. The operation will now be described with reference to the diagrams. The octal counter 801 is counted up such that 0, 1, 2, ... 7, 0, 1, 2, each time the line sync signal is input. The count value of the octal counter 801 is set to 0 at the first line. At this time, the octal counter 802 is counted up such that 0, 1, 2, ... 7, 0, 1, 2, ... every image clock. In this case, a pattern at the top stage in the dither matrix of FIG. 5 is output from the ROM 803 such that 25, 29, 33, 37, ... Now, assuming that the concentration levels of the input image data are uniform to be 30, the result becomes such that L, L, H, H, L, H, H, H, ... (refer to FIG. 10).

When the first line is finished, the octal counter 801 is counted up to 1. By repeating the processings in a manner similar to the above, the input image data is binarized.

FIG. 6 shows an example in the case where a photograph image of 400 ppi×400 ppi was binarized by the high-resolution dither processing unit 5. FIG. 6 shows the processing result in the case where the image data having a uniform concentration level of 17 was input for the dither matrix of FIG. 4. FIG. 7 shows an example in the case where a photograph image of 200 ppi×200 ppi was binarized by the low-resolution dither processing unit 5. FIG. 7 shows the processing result in the case where the image data having a uniform concentration level of 17 was input for the dither matrix of FIG. 5. As will be obviously understood from a comparison between FIGS. 6 and 7, even in the case where the resolutions of the input image data differ, pitches of the systematic dithers constructing the photograph images are equal, so that a visual difference between the photograph images can be reduced.

Moreover, the sizes of the dither matrices for a high resolution and a low resolution are constant and arrangements of the threshold values differ. Therefore, the low-resolution dither processing unit 4 and the high-resolution dither processing unit 5 can be realized by the same hardware construction. Further, the same timing signal can be used for processings.

Figure 11:
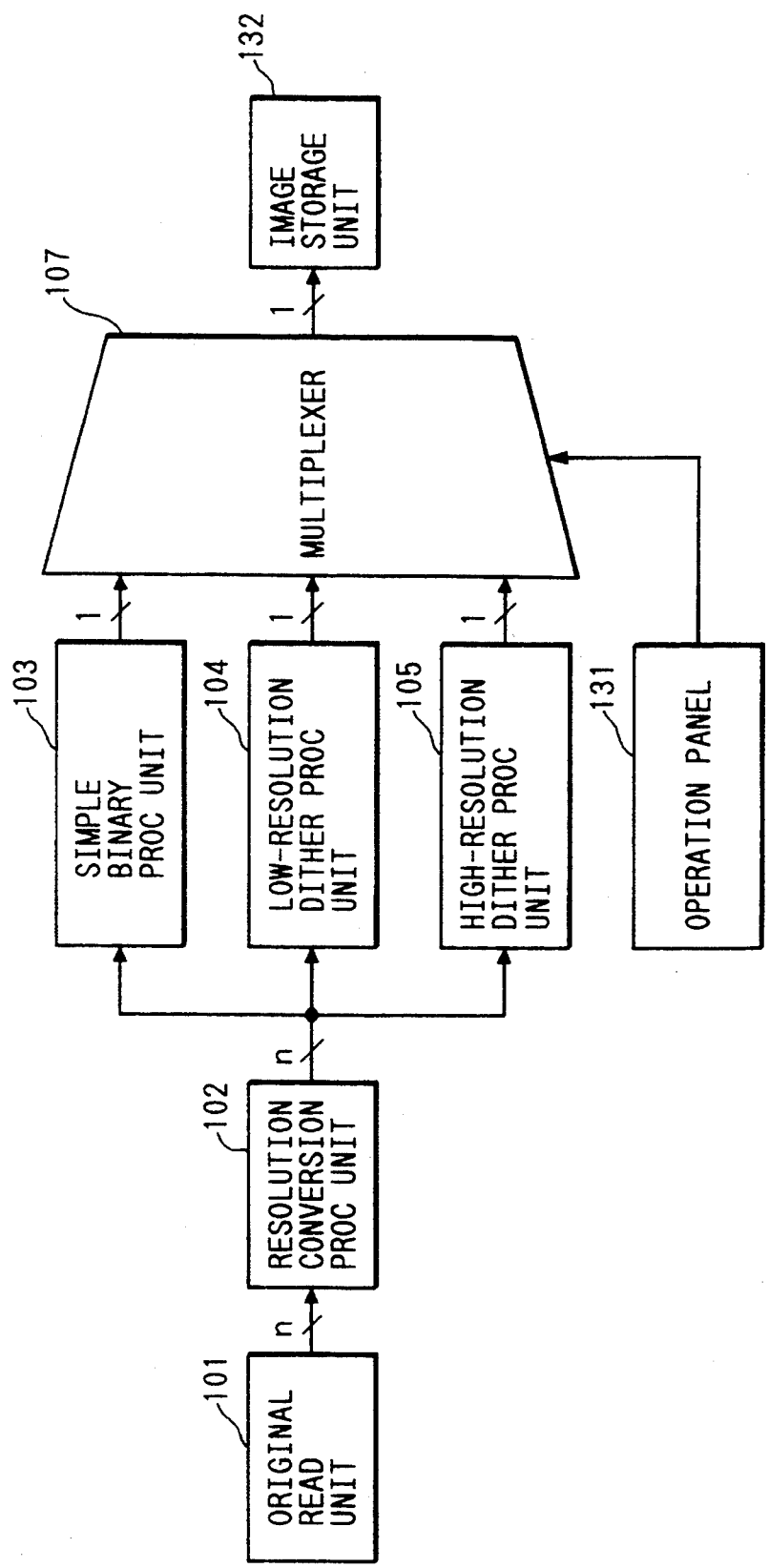
FIG. 11 is a diagram showing an example in the case where the invention was applied to an electronic filing apparatus.

FIG. 11 is a diagram showing an example in the case where the invention was applied to an electronic filing apparatus. Reference numeral 101 denotes an original read unit; 102 a resolution conversion processing unit; 103 a simple binary processing unit; 104 a dither processing unit for a low resolution; 105 a dither processing unit for a high resolution; 131 an operation panel; 107 a multiplexer; and 132 an image storage unit to store binary image data.

Figure 12:
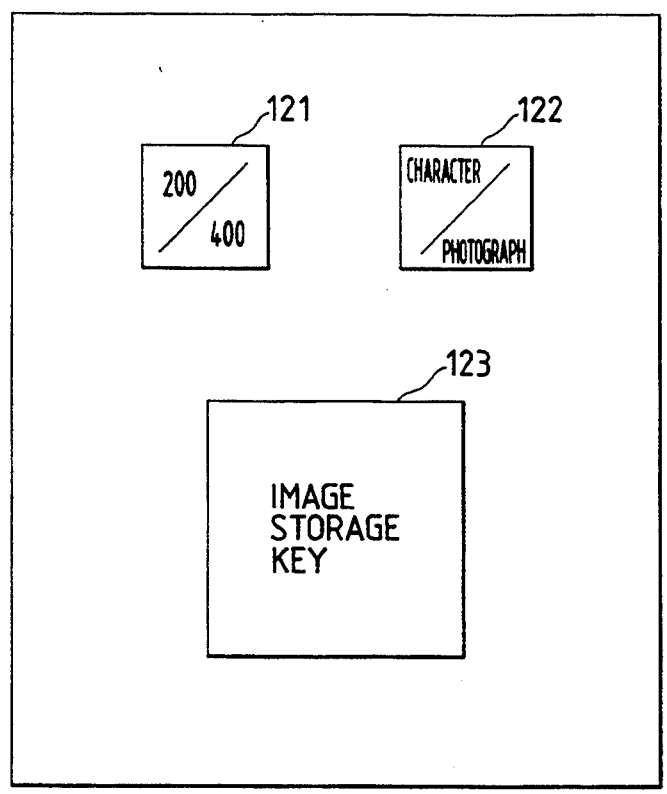
FIG. 12 is a diagram showing an operation panel in FIG. 11.
Figure 13:
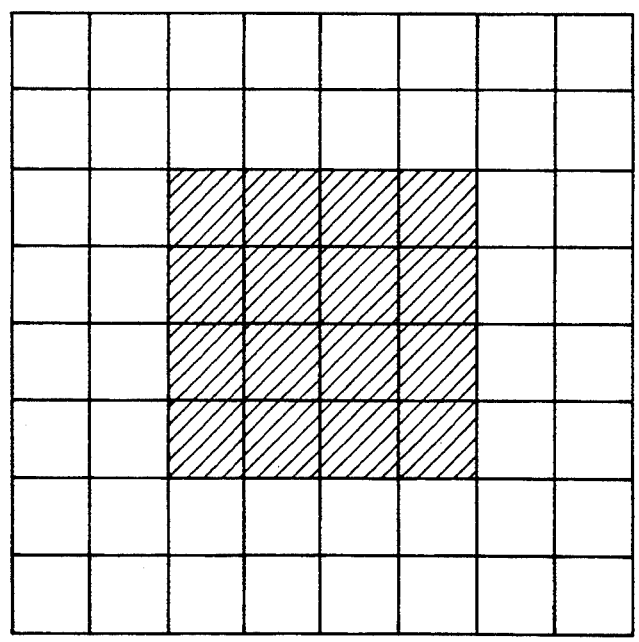
FIG. 13 is a diagram showing the result of an image processing according to a conventional example.

FIG. 12 is a diagram showing the details of the operation panel 131. Reference numeral 121 denotes a resolution selection key; 122 an image read mode selection key; and 123 an image storage key to instruct the start of the image storage.

As an operating method, the selection of the resolution, the selection of the image read mode, and the selection of the binary processing unit are executed by a method similar to that in the facsimile apparatus of FIG. 1 except the following different points.

In FIG. 1, the transmission is started by depressing the start key. However, in FIG. 12, the image data is stored into the image storage unit 132 by depressing the image storage key 123.

Although the embodiments of FIGS. 1 and 11 have been described above with respect to an example in which the image processing apparatus having two kinds of resolutions was used, the invention can also execute image processings for a number of resolutions by further providing dither matrices for a number of kinds of resolutions.

On the other hand, although the embodiments have been constructed so as to select the resolution and the character or photograph mode by the input by the operator, it is also possible to automatically set the resolution and the character or photograph mode by automatically recognizing an original.

As described above, according to the invention, even if the resolution of the input image was changed, the input image can be accurately reproduced.

I claim:

1. An image processing apparatus comprising:

input means for inputting a given body of image data with either one of a high resolution and a low resolution;

first half-tone processing means for half-tone processing input image data of the high resolution by using a first dither matrix;

second half-tone processing means for half-tone processing input image data of the low resolution by using a second dither matrix; and selecting means for selecting either one of said first and second half-tone processing means on the basis of the resolution of the input image data, wherein an arrangement of threshold values in the first dither matrix which is used in said first half-tone processing means differs from that of the second dither matrix which is used in said second half-tone processing means, and wherein the second dither matrix which is used in said second half-tone processing means is constructed by a plurality of small dither matrices and each of the small dither matrices is a spiral-type dither matrix.

2. An apparatus according to claim 1, wherein the input means comprises:

reading means for reading an image of an original and generating image data; and resolution converting means for converting a resolution of the image data obtained from the reading means.

3. An apparatus according to claim 1, wherein the resolution of the input image data is selected by an operator.

4. An apparatus according to claim 3, wherein the first dither matrix which is used in said first half-tone processing means is a spiral-type dither matrix.

5. An apparatus according to claim 1, wherein each of said first and second half-tone processing means binarizes the image data which was input from said input means by using the first and second dither matrices consisting of a plurality of threshold values.

6. An apparatus according to claim 1, further comprising means for encoding the data which was half-tone processed by said first or second half-tone processing means and transmitting the data.

7. An image processing apparatus for half-tone processing input image data by using a dither matrix consisting of a plurality of threshold values, comprising:

selecting means for selecting a resolution of the image data;

input means for inputting the image data in accordance with the resolution selected by said selecting means; and processing means for half-tone processing the image data which was input by said input means by using the dither matrix determined according to the selected resolution, wherein, when the selected resolution is high, said processing means half-tone processes the input image data by using a spiral-type dither matrix, and when the selected resolution is low, said processing means half-tone processes the input image data by using a dither matrix consisting of a plurality of small dither matrices, and each of the small dither matrices is the spiral-type dither matrix.

8. An apparatus according to claim 7, wherein said input means comprises:

reading means for reading an image of an original at a high resolution; and converting means for converting the data of a high resolution which was read by said reading means into the data of a low resolution in the case where the resolution selected by said selecting means is a low resolution.

9. An apparatus according to claim 7, wherein said processing means binarizes the input image data by using a dither matrix.

* * * * *

UNITED STATES PATENT AND TRADEMARK OFFICE
CERTIFICATE OF CORRECTION

PATENT NO. : 5,424,854
DATED : June 13, 1995
INVENTOR(S) : Hashimoto

It is certified that error appears in the above-indentified patent and that said Letters Patent is hereby corrected as shown below:

COLUMN 5

Line 3, "b(0," should read --b(1,--; and
Line 4, "1)→c(1, 0)." should read --0)→c(0, 1).--.

Signed and Sealed this

Fourteenth Day of November, 1995

Attest:

BRUCE LEHMAN

Attesting Officer

Commissioner of Patents and Trademarks